United States Patent

Yokoyama et al.

Patent Number: 5,939,205
Date of Patent: Aug. 17, 1999

[54] GAS BARRIER RESIN FILM

[75] Inventors: Seiichiro Yokoyama; Shigeru Komeda; Kiyoshi Iseki; Yozo Yamada; Chikao Morishige, all of Ohtsu; Hideyuki Mitamura, Inuyama; Satoshi Osame, Tsuruga; Shinji Fujita, Ohtsu, all of Japan

[73] Assignee: Toyo Boseki Kabushiki Kaisha, Osaka, Japan

[21] Appl. No.: 08/839,690

[22] Filed: Apr. 15, 1997

[30] Foreign Application Priority Data

Apr. 16, 1996 [JP] Japan .................................. 8-094332
Jul. 5, 1996 [JP] Japan .................................. 8-176906
Oct. 4, 1996 [JP] Japan .................................. 8-264940

[51] Int. Cl.$^6$ .............................. B32B 27/08; B32B 27/34
[52] U.S. Cl. .................................. 428/474.4; 428/475.8; 428/476.3; 428/477.7; 428/35.2; 428/36.6; 428/36.7; 264/235.8; 264/346
[58] Field of Search .................. 428/35.2, 36.6, 428/474.4, 475.8, 476.3, 477.7, 36.7; 264/235.8, 346

[56] References Cited

U.S. PATENT DOCUMENTS 5,126,211  6/1992  Mizutani et al. .................... 428/474.4

FOREIGN PATENT DOCUMENTS

| 43 44 438 | 6/1995 | Germany . |
| 48511 | 12/1976 | Japan . |
| 51-48511 | 12/1976 | Japan . |
| 101428 | 5/1987 | Japan . |
| 62-101428 | 5/1987 | Japan . |
| 01267036 | 10/1989 | Japan . |
| 1267036 | 10/1989 | Japan . |
| 07276571 | 10/1995 | Japan . |
| 7276571 | 10/1995 | Japan . |

OTHER PUBLICATIONS

Patent Abstracts of Japan, vol. 96 (2), Feb. 29, 1996 (JP 07 276571).

Database WPI, Derwent Publications Ltd., Week 9409, AN 94–068635 (JP 06 016 848 ).

Patent Abstracts of Japan, vol. 8 (124), Jun. 9, 1984 (JP 59 029128).

*Primary Examiner*—Leszek Kiliman
*Attorney, Agent, or Firm*—Leydig, Voit & Mayer, Ltd

[57] ABSTRACT

A gas barrier film comprising a polyamide film and an inorganic deposited layer laminated thereon, wherein the maximum shrinkage percentage after boiling treatment at 95° C. for 30 minutes is not more than 3.5%. The gas barrier film of the present invention has excellent gas barrier property and water vapor-proof property even after boiling or retort treatment. Hence, the film of the present invention can serve well as a wrapping material for a wide range of objects that require high gas barrier property, such as food, medical products, industrial materials and the like, and has great industrial value.

16 Claims, No Drawings

GAS BARRIER RESIN FILM

FIELD OF THE INVENTION

The present invention relates to a gas barrier resin film suitable for wrapping fresh food, processed food, pharmaceutical products, medical equipments, electronic parts and the like (the term "film" including a sheet, hereinafter the same throughout this specification). More particularly, the present invention relates to a gas barrier resin film capable of retaining oxygen barrier property and moisture-proof property, which are important properties in the above-mentioned use, even after boiling treatment or retort treatment.

BACKGROUND OF THE INVENTION

In accord with the varying food distribution systems and dietary habits in recent years, the food packaging style and mode have been strikingly changing, which in turn has created an increasing demands toward high quality wrapping films. A degraded quality of food, which is caused by temperature, moisture, oxygen, ultraviolet rays, microorganisms such as bacteria and mold, and the like during distribution and sales of the food, leads to serious problems of loss of sales and insufficient food hygiene. Such degradation of quality has been conventionally eliminated by adding an antioxidant, a preservative and the like directly to food. In view of increasing levels of strict regulation imposed on food additives for the protection of consumers, however, the amount allowable to be added is inevitably decreasing.

Under the circumstances, a demand has been rising toward a wrapping film having smaller vapor or moisture permeability and which does not degrade food value due to freezing, boiling treatment, retort treatment and the like.

To be specific, when wrapping fish meat, meat, shellfish and the like, oxidation and spoilage of protein, fats and oils, and the like need to be inhibited but taste and freshness should be retained. This requirement is met by cutting off air permeation by the use of a wrapping material having superior gas barrier property. In addition, a gas barrier film used for wrapping food contributes to the retention of flavor of the content and inhibition of moisture permeation. As a result, a dry food is not deteriorated by the absorption of moisture and a water-containing food is not spoiled or solidified by the evaporation of moisture, thus enabling retention of flavor for an extended period of time, which was fresh at the time of wrapping.

For the above-mentioned reasons, it is considered extremely important that a wrapping film used for, for example, a food made from boiled fish paste such as boiled fish sausage, dairy products such as butter and cheese, fermented soybean paste, tea, coffee, ham and sausage, instant food, confectionery such as castella and biscuit, and the like, have oxygen barrier property, moisture-proof property and flavor retaining property. These properties are not to be fulfilled only by a film for wrapping food but are very important for a film used for wrapping medical products that require handling in a sterilized state and electronic parts that require rust-proof property.

As a film having superior oxygen barrier property, moisture-proof property and flavor retention, there have been known, for example, a film wherein a metal such as aluminum is laminated on a plastic film, and a film wherein vinylidene chloride or ethylene vinyl alcohol copolymer is coated.

While the above-mentioned aluminum laminate is superior in economic aspect, oxygen barrier property, moisture-proof property and flavor retention, it is associated with a problem that opacity thereof hides contents after wrapping and that it cannot be placed in a microwave oven, since the film does not pass microwaves.

In addition, a film coated with vinylidene chloride or ethylene vinyl alcohol copolymer has only insufficient gas barrier property against water vapor, oxygen and the like, and shows marked degradation of the property by a high temperature treatment. The film coated with vinylidene chloride generates chlorine gas on incineration, and the adverse influence exerted thereby on the global environment has been a major concern.

There has been known a gas barrier film wherein an inorganic thin layer of silicon oxide or aluminum oxide is formed on a plastic film. For example, Japanese Patent Examined Publication No. 48511/1976 proposes a gas barrier film comprising SixOy (e.g., $SiO_2$) layer deposited on a synthetic resin film as a gas barrier film permitting clear view of the content and use in a microwave oven. However, SiOx (x=1.3–1.8) having superior gas barrier property is slightly brown, and has insufficient transparency.

Japanese Patent Unexamined Publication No. 101428/1987 proposes, as a transparent gas barrier film, a film comprising a layer made from aluminum oxide in the main which is formed on a plastic film. However, the film has insufficient gas barrier property and insufficient flexibility (specifically poor endurance to the gelbo treatment).

A conventional laminate film having an inorganic deposited layer of silica, alumina and the like does not necessarily have sufficient film strength, and poses problems of degraded oxygen barrier property and moisture-proof property after boiling treatment, retort treatment and the like. An inorganic deposited layer of silica, alumina and the like is frequently formed on a polyester film (PET). For example, when a film has a construction of, for example, PET/deposited layer/adhesive layer/oriented nylon (ONY)/adhesive layer/undrawn polypropylene (CPP), the shrinkage of nylon brings about degraded oxygen barrier property and moisture-proof property after boiling treatment, retort treatment and the like. To overcome this problem, a construction of PET/deposited layer/adhesive layer/PET/adhesive layer/undrawn polypropylene (CPP) is commonly employed. This construction nevertheless has only insufficient strength to bear a shock produced by dropping same. As described above, a laminate film having an inorganic deposited layer has been associated with difficulty in accomplishing film strength, oxygen barrier property and moisture-proof property after boiling, retort treatment and the like.

Moreover, there has been proposed films comprising an oriented nylon (Japanese Patent Examined Publication No. 12649/1995) as a substrate to be used for deposition, or a nylon as a laminated layer (Japanese Patent Unexamined Publication No. 276571/1995), both nylons imparting strength to the proposed films. However, neither of them is suitable for practical use, since production and storage during transportation thereof are complicated. Japanese Patent Examined Publication No. 12649/1995 proposes a nylon having smaller shrinkage percentage during high temperature treatment, wherein the shrinkage percentage which is the added absolute values of dimensional variation in the machine direction and transverse direction, said variation being caused by heat treatment at 120° C. for 5 minutes, is not more than 2%. Yet, boiling treatment using hot water at high temperature and retort treatment cause an increase in shrinkage percentage of nylon, thus failing to maintain fine oxygen barrier property and moisture-proof property.

Japanese Patent Unexamined Publication No. 276571/1995 proposes a film comprising an oriented nylon having a smaller shrinkage percentage in hot water, said nylon being laminated on an inorganic deposited layer of a film comprising the inorganic deposited layer and a substrate layer. However, the nylon layer showing a low shrinkage needs to be laminated besides a sealant layer and the process becomes complicated to increase production cost.

SUMMARY OF THE INVENTION

According to the present invention, there has now been provided a gas barrier film which has superior oxygen barrier property and moisture-proof property and which can retain superior oxygen barrier property and moisture-proof property after boiling treatment and retort treatment.

The present invention provides the following.

(1) A gas barrier film comprising at least a polyamide film and an inorganic deposited layer laminated thereon, and having the maximum shrinkage percentage after boiling treatment at 95° C. for 30 minutes of not more than 3.5%.
(2) The film of (1) above, wherein the polyamide film has the maximum shrinkage stress at 170° C. of not more than 900 $gf/mm^2$.
(3) The film of (1) above, wherein the polyamide film has the maximum shrinkage percentage after heat treatment at 170° C. for 10 minutes of not more than 3.5%.
(4) The film of (3) above, wherein the polyamide film is obtained by first drawing an unoriented polyamide film 2.5–4.0 times in the machine direction at a temperature of not less than $(Tg+10)°$ C. and not more than $(Tc+20)°$ C., 1.1–2.9 times in the transverse direction at not less than $(Tc+20)°$ C. and not more than $(Tc+70)°$ C., and then in the transverse direction at not less than $(Tc+70)°$ C. and not more than $(Tm-30)°$ C., so that the total transverse draw ratio becomes 3.0–4.5, and then applying 0–10% relaxing heat treatment in the transverse direction using a tenter at not less than $(Tm-30)°$ C. and not more than $(Tm-10)°$ C.
(5) The film of (1) above, wherein an adhesion strength between the polyamide film and the inorganic deposited layer after boiling treatment at 95° C. for 30 minutes as determined in the air is not less than 100 g/15 mm.
(6) The film of (1) above, wherein an adhesion strength between the polyamide film and the inorganic deposited layer after boiling treatment at 95° C. for 30 minutes as determined in water is not less than 50 g/15 mm.
(7) The film of (1) above, further comprising an anchor coat layer between the polyamide film and the inorganic deposited layer.
(8) The film of (7) above, wherein the anchor coat layer has a compression modulus of not less than 3.0 $kgf/mm^2$ at 40° C.
(9) The film of (7) above, wherein the anchor coat layer comprises a polyester resin or a graft copolymer of a polyester and an acrylic polymer.
(10) The film of (1) above, further comprising a sealant layer laminated on the inorganic deposited layer.
(11) The film of (10) above, wherein the sealant layer is a polyolefin resin film having a compression modulus of not less than 8 $kgf/mm^2$ at 95° C. and a Vicat softening point of not more than 145° C., and the maximum shrinkage percentage of the gas barrier resin film after boiling treatment at 95° C. for 30 minutes relative to the maximum shrinkage percentage of the polyamide film after boiling treatment at 95° C. for 30 minutes is less than 70%.
(12) The film of (10) above, further comprising an adhesive layer between the inorganic deposited layer and the sealant layer.
(13) The film of (12) above, wherein the adhesive layer has a compression modulus of not less than 8.8 $kgf/mm^2$ at 40° C.
(14) The film of (1) above, having an oxygen permeability after boiling treatment at 95° C. for 30 minutes of not more than 15 $cc/m^2 \cdot atm \cdot day$.
(15) The film of (1) above, having a water vapor transmission after boiling treatment at 95° C. for 30 minutes of not more than 10 $g/m^2 \cdot day$.
(16) The film of (1) above, having a peeling strength of not less than 500 g/15 mm as measured by a 90° peel test after heat sealing two sheets of said film at 2 $kgf/cm^2$ for one second at not more than 160° C.
(17) The film of (1) above, having a blocking property as measured according to ASTM-D 1893-67 of not more than 10 g/20 mm.

DETAILED DESCRIPTION OF THE INVENTION

The gas barrier resin film of the present invention comprises a laminate of at least a polyamide film (substrate) and an inorganic deposited layer. The polyamide film is strong, and has particularly high strength against shocks from dropping same.

(polyamide film)

For the property that the gas barrier resin film of the present invention is requested to have, namely, maximum shrinkage percentage after boiling treatment at 95° C. for 30 minutes of not more than 3.5%, to be satisfied, the polyamide film to be used in the present invention preferably has a certain shrinkage stress and/or shrinkage percentage. Specifically, the maximum shrinkage stress at 170° C. is preferably not more than 900 $gf/mm^2$, more preferably not more than 400 $gf/mm^2$ and particularly preferably not more than 200 $gf/mm^2$, and the maximum shrinkage percentage after heat treatment at 170° C. for 10 minutes is preferably not more than 3.5%, more preferably 1.5% and particularly preferably not more than 0.7%. In the present invention, the maximum shrinkage stress and maximum shrinkage percentage respectively mean the maximum value of shrinkage stress and shrinkage percentage measured in the machine direction, transverse direction and directions forming an angle of 30°, 45° or 60° with these directions of a circular sample. In the present specification, the machine direction means the film forming direction and the transverse direction means a direction forming a right angle with said machine direction. When the maximum shrinkage stress or maximum shrinkage percentage of the polyamide film falls outside the above range, the polyamide film shrinks by the boiling treatment at 95° C. for 30 minutes to cause cracks and peeling in the inorganic deposited layer, sometimes decreasing gas barrier property.

The polyamide film to be used in the present invention is not particularly limited with regard to its material as long as it satisfies the above-mentioned shrinkage properties, and homopolyamide, copolyamide or a mixture thereof, or a crosslinked polymer thereof can be used. For example, usable are homopolyamide, copolyamide, a mixture thereof and a crosslinked polymer thereof having an amide repeating unit of the following formula (I) or (II).

—CO—$R_1$—NH—     (I)

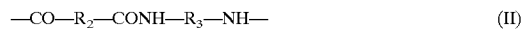

—CO—$R_2$—CONH—$R_3$—NH—     (II)

wherein $R_1$, $R_2$ and $R_3$ are the same or different and each is a linear alkylene, an aromatic ring or an aliphatic alkyl.

Examples of the preferable homopolyamide are polycaproamide (nylon 6), poly-ω-aminoheptanoic acid (nylon 7), poly-9-aminononanoic acid (nylon 9), polyundecaneamide (nylon 11), polylaurolactam (nylon 12), polyethylenediamineadipamide (nylon 2,6), polytetramethyleneadipamide (nylon 4,6), polyhexamethyleneadipamide (nylon 6,6), polyhexamethylenesebacamide (nylon 6,10), polyhexamethylenedodecamide (nylon 6,12), polyoctamethyleneadipamide (nylon 8,6), polydecamethyleneadipamide (nylon 10,6), polydecamethylenesebacamide (nylon10,10), polydodecamethylenedodecamide (nylon 12,12), metaxylenediamide-6 nylon (MXD 6), and the like.

Examples of the preferable copolyamide are caprolactam-laurolactam copolymer, caprolactam-hexamethylenediammonium adipate copolymer, laurolactam-hexamethylenediammonium adipate copolymer, hexamethylenediammonium adipate-hexamethylenediammonium sebacate copolymer, ethylenediammonium adipate-hexamethylenediammonium adipate copolymer, caprolactam-hexamethylenediammonium adipate-hexamethylenediammonium sebacate terpolymer, and the like.

In order to impart the flexibility to the polyamide film, a plasticizer such as aromatic sulfonamides, p-hydroxybenzoic acid and esters thereof, an elastomer component, lactams, and the like having low modulus of elasticity can be added to the polyamide resin. Examples of the elastomer component are ionomer resin, modified polyolefin resin, thermoplastic polyurethane, polyether block amide, polyester block amide, polyether ester amide elastomer, polyester elastomer, modified styrene thermoplastic elastomer, modified acrylic elastomer, modified ethylene-propylene elastomer, and the like.

The aforementioned shrinkage properties that the polyamide film is required to have, namely, the maximum shrinkage stress at 170° C. of not more than 900 gf/mm$^2$ and the maximum shrinkage percentage after heat treatment at 170° C. for 10 minutes of not more than 3.5%, can be imparted to the film by, for instance, biaxially stretching a substantially unoriented polyamide resin film at a suitable temperature and a suitable draw ratio.

Concretely, a film is drawn 2.5–4.0 times in the machine direction at a temperature of not less than [Tg (glass transition temperature)+10]° C. and not more than [Tc (crystallization temperature)+20]° C., and then successively subjected to two-step transverse drawing at different temperatures. In the two-step transverse drawing, the film is first drawn 1.1–2.9 times in the transverse direction at not less than (Tc+20)° C .and not more than (Tc+70)° C., and then in the transverse direction at not less than (Tc+70)° C. and not more than [Tm (melting temperature)−30]° C., so that the total transverse draw ratio becomes 3.0–4.5. Thereafter, 0–10% relaxing heat treatment is applied in the transverse direction using a tenter at not less than (Tm−30)° C. and not more than (Tm−10)° C. By this method, the maximum shrinkage percentage after heat treatment at 170° C. for 10 minutes can be suppressed to not more than 3.5%. After the biaxial orientation, the film is relaxed in the machine direction using plural rolls and/or heat treated using humidified gas at 60–100° C. to make the maximum shrinkage stress at 170° C. not more than 900 gf/mm$^2$.

The above-mentioned polyamide film may comprise, where necessary, other additives such as plasticizers, heat stabilizers, ultraviolet absorbers, antioxidants, colorings, fillers, antistatic agents, antimicrobial agents, lubricants, blocking resistants, other resins and the like, in suitable amounts. The above-mentioned polyamide film may comprise, where necessary, an organic barrier layer composed of, for example, polyvinyl alcohol, ethylene-vinyl acetate copolymer, vinylidene chloride and the like by coating or coextrusion. Where necessary, moreover, other resin may be laminated by coextrusion, whereby other functions can be imparted.

The thickness of the polyamide film is preferably 1–300 μm, more preferably 10–100 μm. When the polyamide film is too thin, the film strength falls, which leads to easy breakage of a bag when dropped, and when it is too thick, processability undesirably becomes poor.

(inorganic deposited layer)

An inorganic deposited layer is laminated on the aforementioned polyamide film. This inorganic deposited layer imparts high gas barrier property to the obtained gas barrier resin film. The material of the inorganic deposited layer having such action include metals such as Al, Si, Ti, Zn, Zr, Mg, Sn, Cu, Fe and the like, and oxides, nitrides, fluorides, sulfates and the like of these metals, which are specifically SiOx (x=1.0–2.0), alumina, magnesia, zinc sulfate, titania, zirconia, cerium oxide, and mixtures thereof. The inorganic deposited layer may be a single layer or a laminate of two or more layers.

The thickness of the aforementioned inorganic deposited layer is preferably 10–5000 Å, more preferably 50–2000 Å. When the thickness is less than 10 Å, sufficient gas barrier property may not be obtained. Conversely, when it exceeds 5000 Å, the effect is not parallel to the thickness but causes lower flexibility and higher production cost.

The aforementioned inorganic deposited layer can be formed by a known method, such as physical deposition (e.g., vacuum deposition, sputtering, ion plating and the like), and chemical deposition (e.g., PECVD).

In the vacuum deposition, the material to be deposited includes, for example, metals such as aluminum, silica, titanium, magnesium, zirconium, cerium and zinc, a compound such as SiOx (x=1.0–2.0), alumina, magnesia, zinc sulfate, titania, zirconia, and mixtures thereof. The heating method includes, for example, resistance heating, induction heating, electron beam heating and the like. As the reaction gas, exemplified are oxygen, nitrogen, hydrogen, argon, carbon dioxide, water vapor and the like. In addition, reactive deposition by the addition of ozone, ion assisting and the like may be used. Furthermore, a bias may be added to the polyamide film, or the polyamide film may be heated or cooled. The aforementioned deposition material, reaction gas, bias loading, heating and cooling may be applied in the sputtering method and CVD method.

(anchor coat layer)

For the property that the gas barrier resin film of the present invention is requested to have, namely, maximum shrinkage percentage after boiling treatment at 95° C. for 30 minutes of not more than 3.5%, to be satisfied, the adhesion strength between the inorganic deposited layer and the polyamide film as measured in the air is preferably not less than 100 g/15 mm, particularly preferably not less than 150 g/15 mm after boiling treatment at 95° C. for 30 minutes, and the adhesion strength between the inorganic deposited layer and the polyamide film as measured in water is preferably not less than 50 g/15 mm, particularly preferably not less than 90 g/15 mm after boiling treatment at 95° C. for 30 minutes. Such adhesion strength can be imparted by subjecting, before or during deposition on polyamide film, the surface of the polyamide film to corona treatment, flame treatment, low temperature plasma treatment, glow discharge treatment, reverse sputtering treatment, surface roughening treatment and the like, or forming an anchor coat layer between the polyamide film and inorganic deposited layer.

When an anchor coat layer is formed, the anchor coat layer preferably has a certain compression modulus, which is preferably not less than 3.0 kgf/mm², more preferably not less than 5.0 kgf/mm² and particularly preferably not less than 9.8 kgf/mm² at 40° C., to afford the property that the gas barrier resin film of the present invention is requested to have, namely, maximum shrinkage percentage after boiling treatment at 95° C. for 30 minutes of not more than 3.5%. The compression modulus within the specified range suppresses thermal shrinkage of the polyamide film due to the boiling treatment and reduces thermal shrinkage of the entire gas barrier resin film.

The material to be used for the anchor coat layer is not particularly limited as long as it satisfies the aforementioned properties. Examples thereof include polyester resin, oil modified alkyd resin, urethane alkyd resin, melamine alkyd resin, epoxy cured acrylic resin, epoxy resin (cured by amine, carboxyl terminal polyester, phenol or isocyanate), isocyanate resin (cured by amine, urea or carboxylic acid), urethane-polyester resin, polyurethane resin, phenol resin, polyester resin, polyamide resin, reactive acrylic resin, vinyl chloride resin and the like. In addition, a resin modified to be water soluble or water dispersible can be used.

Of the aforementioned materials, polyester resin or graft copolymer of polyester and acrylic polymer is preferable in view of the retention of adhesion between polyamide film and inorganic deposited layer and gas barrier property after boiling treatment. In the graft copolymer to be used in the present invention, the backbone polymer may be a polyester and the branch polymer may be an acrylic polymer or the backbone polymer may be an acrylic polymer and the branch polymer may be a polyester.

The ratio of the backbone polymer and the branch polymer in the graft copolymer is 5:95–95:5, preferably 80:20–20:80, by weight.

The molecular weight of the backbone polymer of the aforementioned graft copolymer is 5000–200000, preferably 5000–50000, in the case of polyester, and 5000–200000, preferably 5000–100000, in the case of acrylic polymer. The molecular weight of the branch polymer is 500–50000, preferably 5000–30000, in the case of polyester, and 500–50000, preferably 4000–50000, in the case of acrylic polymer.

The glass transition temperature of this graft copolymer is preferably not more than 30° C., particularly preferably not more than 10° C. When the glass transition temperature exceeds 30° C., the anchor coat layer may be peeled off the polyamide film.

Such graft copolymer can be produced by, but not limited to, the following methods (1)–(4).

(1) A method wherein a reaction initiation point of radical, cation or anion polymerization is produced on a polyester molecule, and using this, a monomer including at least an acrylic monomer is graft polymerized. By this method, a graft copolymer wherein polyester is the backbone polymer and acrylic polymer is a branch polymer can be obtained.

The graft copolymerization method may be a radical copolymerization wherein radical is generated on a polyester molecule by light, heat or radiation, and a monomer including at least an acrylic monomer is graft polymerized; cation polymerization wherein cation is generated on a polyester molecule using a catalyst of $AlCl_3$ or $TiCl_4$, and a monomer including at least an acrylic monomer is graft polymerized; or anion polymerization wherein anion is generated on a polyester molecule using sodium metal, lithium metal and the like, and a monomer including at least an acrylic monomer is graft polymerized.

(2) A method wherein a polyester having an unsaturated polymerizable bond at the main chain, main chain terminal or a side chain is produced and a monomer including at least an acrylic monomer is graft polymerized therewith. According to this method, a graft copolymer wherein a polyester is the backbone polymer and an acrylic polymer is a branch polymer can be obtained.

A method for preparing a polyester having a polymerizable unsaturated bond at the main chain may include copolymerizing a dicarboxylic acid having an unsaturated polymerizable bond during production of polyester. A method for preparing a polyester having an unsaturated polymerizable bond at the main chain terminal may be, for example, one wherein the hydroxy terminal of polyester is reacted with a polymerizable monomer having a functional group reactive with a hydroxyl group, such as carboxyl, acid anhydride, acid chloride, epoxy, isocyanate and the like, and an unsaturated polymerizable bond; or one wherein the carboxy terminal of polyester is reacted with a polymerizable monomer having a functional group reactive with carboxyl, such as hydroxy, amino, isocyanate and the like, and an unsaturated polymerizable bond. A method for preparing a polyester having an unsaturated polymerizable bond at the side chain may include reacting carboxyl or hydroxy present at the polyester side chain with a polymerizable monomer having a functional group reactive with these groups and an unsaturated polymerizable bond.

(3) A method wherein a polyester having a functional group at the side chain and an acrylic polymer having a group reactive with this functional group at the polymer chain terminal are directly reacted, or an acrylic polymer having a functional group at the side chain and a polyester having a group reactive with this functional group at the polymer chain terminal are directly reacted. The former method gives a graft copolymer wherein a polyester is a backbone polymer and an acrylic polymer is a branch polymer, and the latter method gives a graft copolymer wherein an acrylic polymer is a backbone polymer and a polyester is a branch polymer.

The functional group at the polyester side chain is exemplified by hydroxy, carboxyl and the like. The group present at the acrylic polymer chain terminal and reactive with this functional group is exemplified by carboxyl, acid anhydride, acid chloride, epoxy, isocyanate and the like, and a group reactive with carboxyl is exemplified by amino, isocyanate and the like. The functional group at the acrylic polymer side chain includes hydroxy, carboxyl, acid anhydride, acid chloride, epoxy, amino, isocyanate and the like.

(4) A method wherein a polyester having a functional group at the side chain and an acrylic polymer having a functional group at the terminal are bonded using a bifunctional coupling agent reactive with these functional groups, or an acrylic polymer having a functional group at the side chain and a polyester having a functional group at the terminal are bonded using a bifunctional coupling agent reactive with these functional groups. The former method gives a graft copolymer wherein a polyester is a backbone polymer and an acrylic polymer is a branch polymer, and the latter method gives a graft copolymer wherein an acrylic polymer is a backbone polymer and a polyester is a branch polymer. Examples of the functional group of polyester and acrylic polymer include those recited in the aforementioned (3).

In the aforementioned preparation methods (1)–(4), when a polyester is a backbone polymer, an aromatic dicarboxylic acid is preferably used in a proportion of 30–99.9 mol %, particularly preferably 40–99.5 mol % and an aliphatic and/or alicyclic dicarboxylic acid is preferably used in a proportion of 0–70 mol %, particularly preferably 0–60 mol %, as the dicarboxylic acid component. As in the aforementioned preparation method (2), a dicarboxylic acid having a polymerizable unsaturated double bond may be used as necessary. This dicarboxylic acid is preferably contained in a proportion of 0.5–10 mol %, particularly 2–7 mol %, of the entire carboxylic acid component.

The diol component comprises at least one member from aliphatic glycol having 2 to 10 carbon atoms, alicyclic glycol having 6 to 12 carbon atoms and glycol having an ether bond. Where necessary, polycarboxylic acid/polyol having three or more functional groups may be added in a proportion of 0–5 mol %, preferably 0–3 mol %.

In the aforementioned preparation methods (3) and (4), when an acrylic polymer is a backbone polymer, the acrylic polymer is a single polymer or copolymer having at least a monomer unit having a functional group reactive with the functional group at the branch polymer polyester chain terminal such as hydroxy and carboxyl, by the use of which the functional group reactive with hydroxy or carboxy is introduced into the backbone polymer chain to be the graft initiation point of the backbone polymer.

Examples of the monomer having a functional group reactive with hydroxy at the polyester chain terminal include acrylic acid, methacrylic acid, glycidyl acrylate, glycidyl methacrylate, allyl glycidyl ether, acrylic chloride, methacrylic chloride, vinyl isocyanate, allyl isocyanate, methacryloyl isocyanate, vinyl trialkoxysilane and the like.

Examples of the monomer having a functional group reactive with carboxyl at the polyester chain terminal include (meth)acrylic acid derivatives having a hydroxy, such as 2-hydroxy ethyl acrylate, 2-hydroxy propyl acrylate, 2-hydroxy ethyl methacrylate, 2-hydroxy propyl methacrylate, vinyl isocyanate, allyl isocyanate, methacryloyl isocyanate and the like.

Other acrylic monomer is exemplified by alkyl esters of acrylic acid and methacrylic acid, such as methyl acrylate, ethyl acrylate, isopropyl acrylate, n-butyl acrylate, t-butyl acrylate, 2-ethylhexyl acrylate, cyclohexyl acrylate, phenyl acrylate, benzyl acrylate, phenyl ethyl acrylate, lauryl acrylate, stearyl acrylate and those in methacrylate instead of acrylate; acrylic acid and methacrylic acid derivatives having amide, such as acrylamide, N-methyl acrylamide, N-methylol acrylamide, N,N-dimethylol acrylamide, N-methoxymethyl acrylamide, N-phenylacrylamide and those in methacrylamide instead of acrylamide; acrylic acid and methacrylic acid derivatives having amino, such as N,N-diethylaminoethyl acrylate and N,N-diethylaminoethyl methacrylate; and the like, which are used alone or in combination. As the occasion demands, a monomer other than the aforementioned may be copolymerized.

Other monomer is exemplified by nitriles such as acrylonitrile and methacrylonitrile; vinyl esters such as vinyl acetate, vinyl propionate and vinyl benzoate; vinyl ethers such as vinyl methyl ether, vinyl ethyl ether and vinyl isobutyl ether; vinyl ketones such as vinyl methyl ketone, vinyl hexyl ketone and methyl isopropenyl ketone; N-vinyl compounds such as N-vinyl pyrrole, N-vinyl carbazole, N-vinyl indole and N-vinyl pyrrolidone; vinyl halides such as vinyl chloride, vinylidene chloride, vinyl bromide and vinyl fluoride; and aromatic vinyl compounds such as styrene, a-methylstyrene, t-butylstyrene, vinyltoluene and vinyl naphthalene. These monomers-may be used alone or in combination.

Using the aforementioned preparation method (1) or (2), a monomer including at least the aforementioned acrylic monomer is directly subjected to graft polymerization to give a branch polymer when a reaction initiation point can be produced in the backbone polymer polyester or polyester has an unsaturated polymerizable double bond in the molecule. Using the aforementioned preparation method (3) or (4), an acrylic polymer having a functional group reactive with hydroxy or carboxyl at the polymer chain terminal is reacted with hydroxy or carboxyl in the molecule of backbone polymer polyester to give a branch polymer when a reaction initiation point cannot be produced in the backbone polymer polyester or polyester does not have an unsaturated polymerizable double bond in the molecule.

When making the graft copolymer soluble or dispersible in an organic solvent and when the acrylic polymer is the backbone polymer, the polyester can be easily dispersed in the organic solvent due to its lipophilicity. On the other hand, when the acrylic polymer is a branch polymer, alicyclic alkyl acrylate or alkyl methacrylate, or alkyl acrylate or alkyl methacrylate having long alkyl chain, such as 2-ethylhexyl, cyclohexyl, lauryl, stearyl and the like is used as a copolymerization component along with an acrylic polymer, whereby the copolymer can be dispersed in an organic solvent.

When a graft copolymer is to be made water soluble or water dispersible and when an acrylic polymer is the backbone polymer, a hydrophilic polymer such as polyethylene glycol is introduced into the polyester as a copolymerization component to make the polyester hydrophilic; when the acrylic polymer is a branch polymer, a polymerizable monomer having a hydrophilic group or a group that can be later converted to a hydrophilic group is copolymerized in a proportion of 5–95 wt %, preferably 10–90 wt %, most preferably 40–80 wt %, of the entire monomer component to give a branch polymer, whereby the graft copolymer can be dispersed in an aqueous solvent.

The polymerizable monomer having a hydrophilic group or a group that can be later converted to a hydrophilic group is exemplified by monomer having a hydroxy, such as 2-hydroxyethyl acrylate, 2-hydroxypropyl acrylate, 2-hydroxyethyl methacrylate and 2-hydroxypropyl methacrylate; monomer having carboxyl or a salt thereof, such as acrylic acid, methacrylic acid, maleic acid, fumaric acid, itaconic acid, citraconic acid, alkyl monomaleate, alkyl monofumarate, alkyl monoitaconate, alkyl monocitraconate and salts thereof (e.g., sodium salt, potassium salt and ammonium salt); monomer having sulfonic acid such as styrenesulfonic acid, vinylsulfonic acid and salts thereof (e.g., sodium salt, potassium salt and ammonium salt); acid anhydride monomer such as maleic anhydride and itaconic anhydride; monomer having phosphoric acid or a salt thereof, such as 2-(methacryloyloxy)-ethylphosphonic acid and a salt thereof (e.g., sodium salt, potassium salt and ammonium salt); monomer having a quaternary ammonium, such as [2-(methacryloyloxy)ethyl]trimethyl ammonium chloride; and the like.

A polymerization initiator of organic peroxides and organic azo compounds known to those skilled in the art can be used for graft polymerization. As the organic peroxide, exemplified are benzoyl peroxide and t-butyl peroxypivalate; and as the organic azo compound, 2,2'-azobisisobutyronitril and 2,2'-azobis(2,4-dimethylvaleronitrile), and the like. The amount of the polymerization initiator is at least not less than 0.2 wt %, preferably not less than 0.5 wt %, of the polymerizable monomer.

Where necessary, a chain transfer agent for controlling the chain length of the branch polymer, such as octyl mercaptane, mercaptoethanol, 3-t-butyl-4-hydroxyanisole and the like may be used, which is preferably added in a proportion of 0–5 wt % of the polymerizable monomer.

The aforementioned graft copolymer may form an anchor coat layer as it is, or may be cured by adding a crosslinking agent to give an anchor coat layer having a high water resistance. Examples of the crosslinking agent include phenol formaldehyde resin which is a condensation product of alkylated phenols or cresols and formaldehyde; amino resin obtained by etherifying an adduct of urea, melamine, benzoguanamine and the like with formaldehyde, wherein an alkyl moiety of the etherified portion has 1 to 6 carbon atoms; multifunctional epoxy compound; multifunctional isocyanate compound; block isocyanate compound; multifunctional aziridine compound; oxazoline compound; and the like.

The anchor coat layer can be formed by an in-line method comprising coating during production of a polyamide resin film or an off-line method comprising coating in a separate step other than that of the film production. The coating is performed by a known method. For example, roll coating method, reverse coating method, roll brush method, spray coating method, air knife coating method, gravure coating method, impregnation method, curtain coating and the like can be used.

The anchor coat layer may be formed by coating a graft copolymer-containing solution on a biaxially oriented polyamide film and drying, or coating a graft copolymer-containing solution on an unoriented or monoaxially oritented polyamide film, drying, applying a monoaxial or biaxial orientation as necessary and thermosetting the film. When a graft copolymer-containing solution is coated and dried on a biaxially oriented polyamide film, the drying temperature is preferably not less than 150° C., particularly preferably not less than 200° C. Thus, the adhesion between the anchor coat layer and polyamide film can be improved.

The thickness of the anchor coat layer is preferably 0.01–1 μm, more preferably 0.02–0.5 μm. When the anchor coat layer is too thin, the adhesion between the anchor coat layer and polyamide film becomes insufficient, whereas when it is too thick, blocking may occur.

(sealant layer)

The gas barrier resin film of the present invention preferably includes a sealant layer laminated on an inorganic deposited layer. The sealant layer may be heat sealed with another sealant layer to give a sack type gas barrier resin film which can be used for wrapping.

For the property that the gas barrier resin film of the present invention is requested to have, namely, maximum shrinkage percentage after boiling treatment at 95° C. for 30 minutes of not more than 3.5%, to be satisfied, the sealant layer to be used in the present invention preferably has a certain compression modulus.

While the material to be used for the sealant layer is not particularly limited, olefin resins such as polyethylene and ethylene copolymer, polyvinyl alcohol, ethylene-vinyl alcohol copolymer, polypropylene and propylene copolymer and the like; vinyl chloride resins such as polyvinyl chloride and vinyl chloride copolymer; vinylidene chloride resins such as vinylidene chloride-vinyl chloride copolymer; polyester resins such as polyethylene terephthalate; fluororesins such as polytetrafluoroethylene; and the like may be used. A sealant layer is laminated on an inorganic deposited layer in the form of a film, or laminated by coating or by extrusion.

Of the aforementioned materials, the sealant layer is preferably a polyolefin resin film having particularly suitable compression modulus and fine heat sealing property, which preferably satisfies the following (a)–(c).

(a) The compression modulus at 95° C. is preferably not less than 8 kgf/mm$^2$, more preferably not less than 15 kgf/mm$^2$ and particularly preferably not less than 20 kgf/mm$^2$. When the compression modulus is less than 8 kgf/mm$^2$, the gas barrier resin film may have a greater shrinkage percentage due to a failure to prohibit the influence of shrinkage of the polyamide resin film layer after boiling, on the entirety of the gas barrier resin film. When the sealant film has a laminate structure, the compression modulus is calculated by multiplying the compression modulus (determined according to JIS-K 7208) of each laminate layer by the film thickness ratio of each layer relative to the total thickness of the sealant film, and adding the obtained values.

(b) Vicat softening point is preferably not more than 145° C., more preferably not more than 125° C. The varying Vicat softening points become an index showing the heat resistance of the polyolefin resin. A high Vicat softening point means superior heat resistance and greater compression modulus during boiling. When the heat resistance is too high, the heat sealing property becomes poor. When the Vicat softening point exceeds 145° C., the heat sealing temperature needs to be increased or bonding time needs to be prolonged, which is not desirable for production process. In addition, a possibly defective heat sealing may exert adverse influence on the package content. The preferable lower limit of the Vicat softening point is 100° C. When it is lower than 100° C., the compression modulus does not fall within the aforementioned range, which in turn causes adverse influence on the gas barrier property, lower blocking resistance and difficulty in taking up film in the production process. When the sealant film has a laminate structure, the Vicat softening point was calculated by multiplying the Vicat softening point (determined according to ASTM-D 1525) of each laminate layer by the film thickness ratio of each layer relative to the total thickness of the sealant film, and adding the obtained values.

(c) The maximum shrinkage percentage of the gas barrier resin film after boiling treatment at 95° C. for 30 minutes relative to the maximum shrinkage percentage of the polyamide film after boiling treatment at 95° C. for 30 minutes is preferably less than 70%, more preferably less than 60% and particularly preferably less than 50%. When this ratio is not less than 70%, it means that the gas barrier resin film also shrank by boiling treatment along with the shrinkage of the polyamide film, which in turn results in noticeably degraded gas barrier property contrary to the object of the present invention. In the present invention, the maximum shrinkage percentage means the maximum value of shrinkage percentage measured in the machine direction, transverse direction and directions forming an angle of 30°, 45° or 60° with these directions of a circular sample.

The polyolefin resin to be used in the present invention is not particularly limited as long as it satisfies the aforementioned requirements. Specific examples thereof include polyethylene (e.g., linear low density polyethylene, high-pressure-processed low density polyethylene, high density polyethylene and the like), homopolymers such as polypropylene, polybutene-1, poly-4-methylpentene-1 and the like), copolymers such as ethylene/propylene copolymer, ethylene/butene-1 copolymer, ethylene/4-methyl-pentene-1 copolymer, ethylene/decene-1 copolymer, propylene/4-methyl-pentene-1 copolymer, propylene/butene-1 copolymer, decene/4-methyl-pentene-1 copolymer and ethylene/propylene/butene-1 copolymer and the like.

As the linear low density polyethylene, usable is a copolymer of ethylene and at least one kind of α-olefin having 3 to 10 carbon atoms preferably in a proportion of 0.2–20 mol %, more preferably 1–10 mol %, copolymerized in a liquid phase or gas phase. Examples of the α-olefin include propylene, butene-1, pentene-1, hexene-1, octene-1, nonene-1, decene-1, 4-methylpentene-1, 4-methylhexene-1, 4,4-dimethylpentene-1 and the like. Of the linear low density polyethylenes, one having a density of 0.900–0.960 g/cm$^2$ is preferably used. The more preferable density is 0.910–0.950 g/cm$^2$.

The aforementioned polyolefin resin can be produced by any method which may be a gas phase method or liquid phase method. The catalyst may be Ziegler-Natta catalyst, vanadium oxytrichloride, vanadium tetrachloride, organic aluminum, metallocene catalyst or a mixture thereof. The polyolefin resin has an MI (melt index) which is in the range of 1–15 g/10 min (according to JIS K7210 at 230° C.). The polyolefin resin preferably undergoes, for example, deodorization by vacuum treatment.

The above-mentioned polyolefin resin may comprise, where necessary, various additives generally added to polyolefin compositions, such as plasticizers, heat stabilizers, ultraviolet absorbers, antioxidants, colorings, fillers, antistatic agents, antimicrobial agents, lubricants, blocking resistants, and the like in a suitable amount to the extent that the heat sealing property and surface protection effect are not impaired. The blocking resistant is preferably spherical fine particles. The spherical fine particles are conducive to a good balance of the transparency, sliding property and blocking resistance of the film.

The sealant film is preferably superior in heat sealing property, sliding property, blocking resistance, laminating property, gas barrier property, shock resistance, surface protection, mechanical property and the like. While the film may have a single layer structure, since it is difficult to achieve all the aforementioned properties in a single layer, the film preferably has two, more preferably three or more layers, so that each layer bears part of the functions.

When the film has a laminate structure, the polymer constituting each layer may be a copolymer, modified polymer or a blend of heterogeneous polymers, or a laminate of heterogeneous polymers. The Vicat softening point of each layer is preferably not less than 90° C. When it is less than 90° C., superior gas barrier property is difficult to achieve. Due to inferior heat resistance, the part of the film that is not intended to be sealed may melt-bonded during forming a sack or filling the content. The Vicat softening point of each layer is preferably different, and a layer having the lowest Vicat softening point is used as the outermost layer for heat sealing, and the layer having the highest Vicat softening point is used on the inorganic deposited layer side for lamination, since mechanical property such as compression modulus and heat resistance is required.

The Vicat softening point of the laminating film is preferably not less than 90° C., more preferably not less than 120° C. The resins to be laminated should be carefully determined so that the Vicat softening point of the entire sealant layer will not go beyond 145° C.

When the sealant layer in the form of a film is laminated on the inorganic deposited layer, coextrusion forming, such as inflation forming using a circular die and forming using a T die, is preferably used for the production of the aforementioned laminate type sealant film. When formed using a T die, the draft ratio is preferably set to 1–10 and the resin temperature is preferably set to 190–300° C.

When the sealant layer is formed by coating, a solution or emulsion of vinylidene chloride resin such as vinylidene chloride-vinyl chloride copolymer, polyester resin such as polyethylene terephthalate, fluororesin such as polytetrafluoroethylene, and the like is used, with preference given to vinylidene chloride resin latex and a solution of vinylidene chloride resin in a solvent such as tetrahydrofuran and the like.

When a vinylidene chloride resin is coated, an adhesion accelerator such as isocyanate, polyethyleneimine and organic titanium and a polyurethane or polyester adhesive may be applied between the resin and the base.

The thickness of the sealant layer is appropriately determined according to gas barrier property and the total thickness of the gas barrier resin film. It is generally 5–150 μm, typically 15–80 μm.

(adhesive layer)

When such sealant layer is laminated on an inorganic deposited layer, an adhesive layer is preferably formed to enhance adhesion between the layers. For the property that the gas barrier resin film of the present invention is requested to have, namely, maximum shrinkage percentage after boiling treatment at 95° C. for 30 minutes of not more than 3.5%, to be satisfied, the adhesive layer to be used in the present invention preferably has a certain compression modulus. Specifically, the compression modulus at 4° C. is preferably not less than 8.8 kgf/mm$^2$, more preferably not less than 17.6 kgf/mm$^2$. This range of compression modulus is conducive to the suppression of thermal shrinkage of the polyamide film which is caused by the boiling treatment to ultimately reduce thermal shrinkage of the gas barrier resin film as a whole.

The material to be used for the adhesive layer is not limited as long as it can satisfy the aforementioned requirements. Examples thereof include various known adhesives such as polyurethane resin, acrylic resin, polyester resin, epoxy resin, vinyl chloride resin, vinyl acetate resin, polyethylene resin, polypropylene resin, melamine resin and the like.

For an improved adhesion, one or more kinds of the aforementioned adhesive resins may be mixed by melting and used, or a compound having, for example, carboxyl or acid anhydride as a functional group, a compound having a (meth)acrylic acid or (meth)acrylate skeleton, an epoxy compound having glycidyl or glycidyl ether, or a compound having oxazolyl, isocyanato, amino, hydroxy and the like may be concurrently used.

The adhesive layer can be formed by dry laminating, wet laminating using an emulsion, melt extrusion laminating, coextrusion laminating and the like. Alternatively, it can be formed by coating. The coating weight of the adhesive layer is generally 0.1–10 g/m$^2$, typically 1–5 g/m$^2$, as a solid.

The thickness of the gas barrier resin film of the present invention can be determined within the range of 10–1000 μm, particularly 30–300 μm according to the object of use and in view of strength, flexibility, economical aspect and the like. The gas barrier resin film of the present invention can be laminated with paper, aluminum foil, wood, cloth, nonwoven fabric and the like. In addition, a printed layer may be formed or a printed film may be laminated thereon.

The gas barrier resin film of the present invention is required to have a maximum shrinkage percentage after boiling treatment at 95° C. for 30 minutes of not more than 3.5%, preferably not more than 1.5%, more preferably not more than 0.7% and most preferably not more than 0.4%. In addition, the maximum shrinkage percentage of the gas barrier resin film after boiling treatment at 95° C. for 30 minutes relative to the maximum shrinkage percentage of the polyamide film after boiling treatment at 95° C. for 30 minutes is preferably less than 70%, more preferably less than 60% and particularly preferably less than 50%. Such properties enable retention of gas barrier property after boiling treatment or retort treatment. To be specific, oxygen permeability after boiling treatment at 95° C. for 30 minutes is preferably not more than 15 cc/m$^2$·atm·day, more preferably not more than 10 cc/m$^2$·atm·day, and water vapor transmission after boiling treatment at 95° C. for 30 minutes is preferably not more than 10 g/m$^2$·day, more preferably not more than 6 g/m$^2$·day.

When the maximum shrinkage percentage after boiling treatment at 95° C. for 30 minutes exceeds 3.5%, the film shrinks by boiling treatment or retort treatment to cause cracks and peelings in the inorganic deposited layer, thus degrading gas barrier property.

The gas barrier resin film having the aforementioned properties can be obtained by satisfying one or more properties from ① to ⑥ in the following.

① The shrinkage stress of polyamide film in a suitable range (specifically, the maximum shrinkage stress at 170° C. is preferably not more than 900 gf/mm$^2$, more preferably not more than 400 gf/mm$^2$ and particularly preferably not more than 200 gf/mm$^2$).

② The shrinkage percentage of polyamide film in a suitable range (specifically, the maximum shrinkage percentage after heat treatment at 170° C. for 10 minutes is preferably not more than 3.5%, more preferably not more than 1.5% and particularly preferably not more than 0.7%).

③ The adhesion strength between polyamide film and inorganic deposited layer in a suitable range (specifically, the adhesion strength after boiling treatment at 95° C. for 30 minutes as measured in the air is preferably not less than 100 g/15 mm, more preferably not less than 150 g/15 mm, particularly, that after boiling treatment at 95° C. for 30 minutes as measured in water is preferably not less than 50 g/15 mm, more preferably not less than 90 g/15 mm).

④ The compression modulus of anchor coat layer in a suitable range (specifically, the compression modulus of anchor coat layer at 40° C. is preferably not less than 3.0 kgf/mm$^2$, more preferably not less than 5.0 kgf/mm$^2$ and particularly preferably not less than 9.8 kgf/mm$^2$).

⑤ The compression modulus of sealant layer in a suitable range (specifically, the sealant layer is a polyolefin resin film preferably having a compression modulus at 95° C. of not less than 8 kgf/mm$^2$, more preferably not less than 15 kgf/mm$^2$ and most preferably not less than 20 kgf/mm$^2$).

⑥ The compression modulus of adhesive layer in a suitable range (specifically, the compression modulus of adhesive layer at 4° C. is not less than 8.8 kgf/mm$^2$, more preferably not less than 17.6 kgf/mm$^2$).

According to the present invention, reduced shrinkage percentage and reduced shrinkage stress of the polyamide film lead to an improved gas barrier property of the gas barrier resin film after boiling treatment. By increasing the compression modulus of the sealant layer, the gas barrier property of the gas barrier resin film after boiling treatment can be improved even if the shrinkage percentage and shrinkage stress of the polyamide film are somewhat higher. In addition, by increasing the compression modulus of the anchor coat layer and adhesive layer, the gas barrier property of the gas barrier resin film after boiling treatment can be improved. In this way, the shrink property or elasticity of each layer is so combined as to ultimately improve the gas barrier property.

When the gas barrier resin films are heat sealed at 2 kgf/cm$^2$ for one second and subjected to 900 peel test and the temperature at which the peeling strength became not less than 500 g/15 mm is taken as a heat sealing initiation temperature, the gas barrier resin film of the present invention shows a heat sealing initiation temperature of preferably not more than 160° C., more preferably not more than 135° C. and particularly preferably not more than 120° C.

The gas barrier resin film of the present invention moreover has a blocking resistance as measured according to ASTM-D 1893-67 of preferably not more than 10 g/20 mm, more preferably not more than 7 g/20 mm.

The gas barrier resin film of the present invention maintains superior gas barrier property even after boiling treatment and retort treatment. Hence, it can be used as a wrapping material for, for example, food which undergoes such treatments during packaging process, such as fermented soybean paste, pickles, side dish, baby food, shellfish boiled in sweetened soy sauce, konnyaku, tubular roll of boiled fish paste, boiled fish sausage, processed marine products, processed meet products (e.g., meatball, hamburger steak, Mongolian mutton barbecue, ham, sausage and others), green tea, coffee, black tea, dried bonito, tangle flakes, oil confectionery (e.g., potato chips and butter peanut), rice crackers, biscuit, cookie, cake, steamed bun, castella, cheese, butter, cut rice cake, soup, sauce, noodle, wasabi and the like, as well as an industrial packaging material for medical, electronic, chemical and machinery products such as tooth paste, pet food, agricultural chemical, fertilizer, fusion pack, semiconductor, precision material and the like. As a wrapping material, the film can be formed into sack, lid, cup, tube, standing bag and the like.

The present invention is more detailedly explained by means of Examples. The present invention is not limited to these Examples but may be modified as long as it does not deviate from the scope of the invention.

<Measurement method>

1. gas barrier property

Oxygen permeability of a film was determined using an oxygen permeability measuring apparatus (OX-TRAN 10/50A manufactured by Modern Controls). The film was subjected to determination after being kept at 25° C., humidity 0% under an oxygen atmosphere for 2 days. Water vapor transmission of a film was determined using a water vapor transmission measuring apparatus (PERMATRAN manufactured by Modern Controls). The film was subjected to determination after being kept at 40° C., humidity 90% under a water vapor atmosphere for 2 days.

2. shrinkage percentage of gas barrier resin film

A gas barrier resin film was cut into a circle having a diameter of 200 mm and the sizes were measured in the machine direction, transverse direction, directions forming an angle of 30°, 45° or 60° with those directions, at 25° C. under humidity 0%. Then, the film was subjected to boiling treatment at 95° C. for 30 minutes, and the size of the above-mentioned sites was measured again at room temperature (about 25° C.). Shrinkage percentages were calculated from the obtained values, and the maximum value was taken as the maximum shrinkage percentage.

3. shrinkage percentage of polyamide film

A polyamide film was cut into a circle having a diameter of 200 mm and the sizes were measured in the machine direction, transverse direction, directions forming an angle of 30°, 45° or 60° with those directions, at 25° C. under humidity 0%. Then, the film was subjected to heat treatment at 170° C. for 10 minutes or boiling treatment at 95° C. for 30 minutes, and the size of the above-mentioned sites was measured again at room temperature (about 25° C.). Shrinkage percentages were calculated from these values, and the maximum value was taken as the maximum shrinkage percentage.

4. shrinkage stress of polyamide film

Shrinkage stresses were calculated from a load-deformation curve with respect to the machine direction, transverse direction, directions forming an angle of 30°, 45° or 60° with those directions of a polyamide film.

5. compression modulus of sealant layer, anchor coat layer and adhesive layer

Compression modulus of each layer was measured at 40° C. or 95° C. in the air using an S—S TMA measuring apparatus according to JIS-K 7208. With respect to the anchor coat layer and the adhesive layer, measurement was done using a layer obtained by coating on a releasing film, drying and peeling therefrom.

6. adhesion strength

A gas barrier resin film was boiled at 95° C. for 30 minutes. An s—s curve between a polyamide film and an inorganic deposited layer was determined using TENSILON UTM2 manufactured by ORIENTEC upon peeling the polyamide film and the inorganic deposited layer from each other to a peel angle of 90° in the air (about 25° C.) or in water (about 25° C.), according to JIS-K 6854. For a simple determination of an s-s curve in water, a similar evaluation can be made by dropping water on the peel surface. The peel surface was identified using both an electron microscope and a fluorescent X-ray apparatus manufactured by RIGAKUKOGYO CO., LTD.

7. Vicat softening point of sealant film

Vicat softening point of a sealant film was measured at room temperature (about 25° C.) according to ASTM-D 1525.

8. heat sealing initiation temperature

Gas barrier resin films were heat sealed at various temperatures for one second at 2 kgf/cm$^2$, and subjected to 90° peel test. The temperature at which the peeling strength became not less than 500 g/15 mm was taken as a heat sealing initiation temperature.

9. blocking resistance

Blocking resistance of a gas barrier resin film was measured at room temperature (about 25° C.) according to ASTM-D 1893-67.

EXAMPLE 1

As the polyamide film, a nylon film (6-nylon, thickness 15 μm, maximum shrinkage stress at 170° C. : 900 gf/mm$^2$, maximum shrinkage percentage after heat treatment at 170° C. for 10 minutes : 3.5%) was used, and an inorganic deposited layer was formed by the following steps.

The 6-nylon film was transported to a vacuum evaporator. In a chamber maintained at a pressure of $1 \times 10^{-5}$ Torr, a mixed oxide of 62 wt % of $SiO_2$ and 38 wt % of $Al_2O_3$ was evaporated by heating with 15 kw electron beam to allow deposit of a colorless, transparent inorganic oxide layer (thickness: 270 Å) on the nylon film. Then, an unoriented polyethylene film (thickness : 55 μm) was dry-laminated on the inorganic deposited layer as a sealant layer using an adhesive (A310/A10, manufactured by TAKEDA CHEMICAL INDUSTRIES LTD., coating weight : 2 g/m$^2$), followed by aging at 45° C. for 4 days to give a gas barrier resin film. The obtained gas barrier resin film was evaluated for the maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

EXAMPLE 2

The procedure of Example 1 was repeated except that a 6-nylon film having 600 gf/mm$^2$ of maximum shrinkage stress at 170° C. and 3.5% of maximum shrinkage percentage after heat treatment at 170° C. for 10 minutes was used as a polyamide film, and silicon monoxide (SiO) was used as a material of an inorganic deposited layer, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

EXAMPLE 3

The procedure of Example 1 was repeated except that a 6-nylon film having 400 gf/mm$^2$ of maximum shrinkage stress at 170° C. and 1.5% of maximum shrinkage percentage after heat treatment at 170° C. for 10 minutes was used as a polyamide film, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

EXAMPLE 4

The procedure of Example 1 was repeated except that a 6-nylon film having 200 gf/mm$^2$ of maximum shrinkage stress at 170° C. and 0.7% of maximum shrinkage percentage after heat treatment at 170° C. for 10 minutes was used as a polyamide film, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

EXAMPLE 5

The procedure of Example 4 was repeated except that a 0.5 μm-thick layer of polyester resin (Vylon manufactured by TOYO BOSEKI KABUSHIKI KAISHA) having 12 kgf/mm$^2$ of compression modulus at 40° C. was formed as an anchor coat layer between the 6-nylon film and the inorganic deposited layer, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

Comparative Example 1

The procedure of Example 1 was repeated except that a 6-nylon film having 1200 gf/mm$^2$ of maximum shrinkage stress at 170° C. and 4.2% of maximum shrinkage percentage after heat treatment at 170° C. for 10 minutes was used as a polyamide film, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 1.

TABLE 1

| | properties of polyamide film | | shrinkage after boiling treatment (%) | adhesion strength in the air (g/15 mm) | | adhesion strength in water, after boiling (g/15 mm) | oxygen permeability (cc/m² · day · atm) | | water vapor transmission (g/m² · atm) | |
|---|---|---|---|---|---|---|---|---|---|---|
| | maximum shrinkage stress (gf/mm²) | maximum shrinkage (%) | | before boiling | after boiling | | before boiling | after boiling | before boiling | after boiling |
| Example 1 | 900 | 3.5 | 2.5 | 510 | 255 | 34 | 1.4 | 3.0 | 2.0 | 3.9 |
| Example 2 | 600 | 3.5 | 1.5 | 305 | 100 | 32 | 2.7 | 4.2 | 3.3 | 5.5 |
| Example 3 | 400 | 1.5 | 0.7 | 530 | 253 | 41 | 0.6 | 1.0 | 1.3 | 1.7 |
| Example 4 | 200 | 0.7 | 0.4 | 520 | 251 | 38 | 0.2 | 0.4 | 0.7 | 0.8 |
| Example 5 | 200 | 0.7 | 0.4 | 680 | 650 | 110 | 0.5 | 0.2 | 2.2 | 3.6 |
| Com. Ex. 1 | 1200 | 4.2 | 3.9 | 505 | 66 | 25 | 1.7 | 58 | 2.2 | 10 |

From Table 1, it is evident that the gas barrier resin films obtained in Examples 1 to 5 maintained very low oxygen permeability and water vapor transmission even after boiling treatment at 95° C. for 30 minutes. In contrast, the gas barrier resin film obtained in Comparative Example 1 showed remarkably increased oxygen permeability and water vapor transmission after boiling treatment at 95° C. for 30 minutes, thus indicating noticeably degraded gas barrier property.

EXAMPLE 6

As a polyamide film, a 6-nylon obtained from E-caprolactam as a main material was used. During the film forming process, a corona treatment was applied to the film surface. The obtained film had maximum shrinkage percentage (B%) after boiling treatment at 95° C. for 30 minutes of 1.5% (transverse direction: 1.5%, machine direction: 1.0%) and shrinkage stress per unit cross sectional area of 1.2 kgf/mm².

The corona-treated 6-nylon film obtained was set on an unwind roll in an evaporator. Silicon dioxide and aluminum oxide were evaporated by heating in an electron beam heat type vacuum evaporator, and the 6-nylon film was run above the deposit source to form an inorganic deposited layer. The thickness of the inorganic deposited layer was 200 Å and an aluminum oxide content was 40% by weight.

A two-liquid polyurethane adhesive (A310/A10, Tg: −12° C., manufactured by TAKEDA CHEMICAL INDUSTRIES LTD.) was coated on the deposited layer in a coating weight of 5 g/m², and a sealant layer of polyolefin resin film shown in Table 2 (three layers : 55 μm) was dry-laminated thereon to give a gas barrier film.

EXAMPLES 7–10

The procedure of Example 6 was repeated except that the polyolefin resin film shown in Table 2 was used as a sealant layer, whereby a gas barrier resin film was obtained.

EXAMPLE 11

The procedure of Example 10 was repeated except that a 0.5 μm thick layer (compression modulus at 40° C., 12 kgf/mm²) of polyester resin (Vylon manufactured by TOYO BOSEKI KABUSHIKI KAISHA) was formed as an anchor coat layer between the 6-nylon film and the inorganic deposited layer, whereby a gas barrier resin film was obtained.

EXAMPLE 12

The procedure of Example 11 was repeated except that a polyester resin (Vylon manufactured by TOYO BOSEKI KABUSHIKI KAISHA) and an isocyanate curing agent (CORONATE L manufactured by Nihon Polyurethane Kabushiki Kaisha) were coated as a two-liquid polyurethane adhesive, whereby a gas barrier resin film was obtained. The obtained adhesive layer had a compression modulus at 40° C. of 10 kgf/mm² and a thickness of 5 μm.

The compression modulus at 95° C. and Vicat softening point of the polyolefin resin films used in Example 6–12 are shown in. Table 3. The gas barrier resin films obtained in Example 6–12 were evaluated for maximum shrinkage percentage (A%) after boiling treatment at 95° C. for 30 minutes, ratio of the maximum shrinkage percentage after boiling treatment at 95° C. for 30 minutes to that of the polyamide film (A/B), sealing initiation temperature, blocking resistance, oxygen permeability, water vapor transmission and adhesion strength between the polyamide film and the inorganic deposited layer (in the air and in water). The results are shown in Table 4.

TABLE 2

Construction of gas barrier resin film

| | polyamide film | inorganic deposited layer | polyolefin resin film |
|---|---|---|---|
| Example 6 | 6-nylon | SiO₂ + Al₂O₃ | HDPE/L-LDPE/L-LDPE three layers: 55 μm |
| Example 7 | 6-nylon | SiO₂ + Al₂O₃ | HDPE/L-LDPE two layers: 60 μm |
| Example 8 | 6-nylon | SiO₂ + Al₂O₃ | HDPE/L-LDPE two layers: 80 μm |
| Example 9 | 6-nylon | SiO₂ + Al₂O₃ | Et-Pr(R)/L-LDPE/L-LDPE three layers: 55 μm |
| Example 10 | 6-nylon | SiO₂ + Al₂O₃ | Et-Pr(R)80 + Et-Pr(B)20/ Et-Pr(R)90 + Et-Pr-Bu10/ Et-Pr(R)98 + Et-Pr-Bu 2 three layers: 40 μm |
| Example 11 | 6-nylon (polyester resin coat 0.5 μm) | SiO₂ + Al₂O₃ | Et-Pr(R)80 + Et-Pr(B)20/ Et-Pr(R)90 + Et-Pr-Bu10/ Et-Pr(R)98 + Et-Pr-Bu 2 three layers: 40 μm |
| Example 12 | 6-nylon (polyester resin coat 0.5 μm) | SiO₂ + Al₂O₃ | Et-Pr(R)80 + Et-Pr(B)20/ Et-Pr(R)90 + Et-Pr-Bu10/ Et-Pr(R)98 + Et-Pr-Bu 2 three layers: 40 μm |

TABLE 3

Property of polyolefin resin film

| | compression modulus at 95° C. [kgf/mm$^2$] | Vicat softening point (° C.) | | |
|---|---|---|---|---|
| | | total | max* | min** |
| Example 6 | 10 | 115 | 120 | 110 |
| Example 7 | 10 | 115 | 125 | 100 |
| Example 8 | 12 | 120 | 120 | 110 |
| Example 9 | 15 | 125 | 145 | 110 |
| Example 10 | 20 | 135 | 140 | 130 |
| Example 11 | 20 | 135 | 140 | 130 |
| Example 12 | 20 | 135 | 140 | 130 |

*: value of layer having highest Vicat softening point from among the polyolefin films
**: value of layer having lowest Vicat softening point from among the polyolefin films

TABLE 4

| Example | gas barrier film maximum shrinkage (A %) | A/B* | sealing initiation temp. (° C.) | blocking resistance | oxygen permeability [cc/m$^2$·atm·day] before boiling | oxygen permeability after boiling | water vapor transmission [cc/m$^2$·day] before boiling | water vapor transmission after boiling | adhesion strength (g/15 mm) after boiling (in air) | adhesion strength after boiling (in water) |
|---|---|---|---|---|---|---|---|---|---|---|
| 6 | 1.00 | 0.67 | 115 | 8 | 0.8 | 9.8 | 6.1 | 6.3 | 200 | 33 |
| 7 | 0.90 | 0.60 | 116 | 7 | 0.8 | 9.0 | 6.1 | 6.2 | 210 | 35 |
| 8 | 0.90 | 0.60 | 116 | 7 | 0.8 | 8.6 | 6.1 | 6.2 | 235 | 41 |
| 9 | 0.80 | 0.53 | 118 | 6 | 0.8 | 8.2 | 6.1 | 6.3 | 230 | 42 |
| 10 | 0.60 | 0.40 | 133 | 5 | 0.7 | 5.4 | 6.0 | 6.2 | 275 | 45 |
| 11 | 0.27 | 0.40 | 133 | 5 | 0.5 | 2.0 | 2.2 | 3.0 | 620 | 120 |
| 12 | 0.27 | 0.40 | 133 | 5 | 0.5 | 1.8 | 2.2 | 3.0 | 610 | 115 |

$$*A/B = \frac{\text{maximum shrinkage (\%) of gas barrier resin film (after boiling treatment at 95° C., 30 min)}}{\text{maximum shrinkage (\%) of polyamide film (after boiling treatment at 95° C., 30 min)}}$$

The materials and abbreviations shown in Table 2 are as follows.
(1) polyamide film
  polycaproamide : 6-nylon
(2) inorganic deposited layer
  silicon dioxide+aluminum oxide: $SiO_2+Al_2O_3$
(3) polyolefin film
  high density polyethylene: HDPE
  high-pressure-processed low density polyethylene: LDPE
  linear low density polyethylene: L-LDPE
  ethylene-propylene random copolymer : Et—Pr (R)
  ethylene-propylene block copolymer: Et—Pr (B)
  ethylene-propylene-butene random terpolymer : Et—Pr—Bu
  biaxially oriented polypropylene : OPP

EXAMPLE 13

Using a nylon film (6-nylon, thickness: 15 μm, maximum shrinkage stress at 170° C.: 470 gf/mm$^2$) as a polyamide film, an inorganic deposited layer was formed in the following manner. The 6-nylon film was supplied to a vacuum evaporator. Glass (80 wt % of $SiO_2$ and 20 wt % of $Al_2O_3$) was evaporated by heating with 15 kw electron beam, whereby a colorless, transparent inorganic deposited layer (thickness: 200 Å) was formed in a chamber maintained at a pressure of 1×10$^{-5}$ Torr.

Then, an unoriented polyethylene film (L6100 manufactured by TOYO BOSEKI KABUSHIKI KAISHA, thickness: 55 μm) was dry-laminated as a sealant layer using an adhesive (A310/A10, manufactured by TAKEDA CHEMICAL INDUSTRIES LTD., coating weight : 2 g/m$^2$), followed by aging at 45° C. for 4 days to give a gas barrier resin film. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 5.

EXAMPLE 14

The procedure of Example 13 was repeated except that a 0.5 μm-thick layer (compression modulus at 40° C., 12 kgf/mm$^2$) of polyester resin (Vylon manufactured by TOYO BOSEKI KABUSHIKI KAISHA) was formed as an anchor coat layer between the 6-nylon film and the inorganic deposited layer, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 5.

EXAMPLE 15

The procedure of Example 13 was repeated except that an inorganic deposited layer was laminated using silicon oxide (SiO, purity 99%) instead of glass (80 wt % of $SiO_2$ and 20 wt % of $Al_2O_3$) as a depositing material, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 5.

Comparative Example 2

The procedure of Example 13 was repeated except that a nylon film (6-nylon film, thickness 15 μm, maximum shrinkage stress at 170° C., 980 gf/mm$^2$) was used to give a gas barrier resin film. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 5.

Comparative Example 3

The procedure of Example 14 was repeated except that a 2 μm-thick polyvinyl alcohol was used as an anchor coat layer, whereby a gas barrier resin film was obtained. The obtained gas barrier resin film was evaluated for maximum shrinkage percentage after boiling treatment at 95° C. for 30 minutes, adhesion strength between the 6-nylon film and the inorganic deposited layer (in the air and in water), oxygen permeability and water vapor transmission. The results are shown in Table 5.

TABLE 5

|  | maximum shrinkage (%) | adhesion strength (in air) (g/15 mm) | adhesion strength (in water) (g/15 mm) | oxygen permeability [cc/m$^2$ · atm · day] | water vapor transmission [g/m$^2$ · day] |
| --- | --- | --- | --- | --- | --- |
| Example 13 | 2.5 | 250 | 43 | 2.2 | 6.2 |
| Example 14 | 1.5 | 500 | 110 | 1.2 | 4.1 |
| Example 15 | 3.5 | 100 | 70 | 3.3 | 6.8 |
| Comp. Ex. 2 | 4.7 | 250 | 40 | 36 | 55 |
| Comp. Ex. 3 | 4.6 | 65 | 31 | 48 | 61 |

From Table 5, it is evident that the gas barrier resin films obtained in Examples 13 to 15 maintained very low oxygen permeability and water vapor transmission even after boiling treatment at 95° C. for 30 minutes. In contrast, the gas barrier resin films obtained in Comparative Examples 2 and 3 showed remarkably increased oxygen permeability and water vapor transmission after boiling treatment at 95° C. for 30 minutes, thus indicating noticeably degraded gas barrier property.

As has been been clarified in the foregoing description, the present invention provides a gas barrier film having excellent gas barrier property and water vapor-proof property even after boiling treatment or retort treatment. The film of the present invention can serve well as a wrapping material for a wide range of objects that require high gas barrier property, such as food, medical products, industrial materials and the like, and has great industrial value.

What is claimed is:

1. A gas barrier film comprising an inorganic vapor deposited layer and a polyamide film having a 0.01–1 μm thick anchor coat layer formed on at least one side thereof, said deposited layer being directly laminated on the anchor coat layer, wherein the gas barrier film has a maximum shrinkage percentage after boiling treatment at 95° C. for 30 minutes of not more than 3.5%.

2. The film of claim 1, wherein the polyamide film has the maximum shrinkage stress at 170° C. of not more than 900 gf/mm$^2$.

3. The film of claim 1, wherein the polyamide film has the maximum shrinkage percentage after heat treatment at 170° C. for 10 minutes of not more than 3.5%.

4. The film of claim 3, wherein the polyamide film is obtained by first drawing an unoriented polyamide film 2.5–4.0 times in the machine direction at a temperature of not less than (Tg+10)° C. and not more than (Tc+20)° C., 1.1–2.9 times in the transverse direction at not less than (Tc+20)° C. and not more than (Tc+70)° C., and then in the transverse direction at not less than (Tc+70)° C. and not more than (Tm–30)° C., so that the total transverse draw ratio becomes 3.0–4.5, and then applying 0–10% relaxing heat treatment in the transverse direction using a tenter at not less than (Tm–30)° C. and not more than (Tm–10)° C.

5. The film of claim 1, wherein an adhesion strength between the polyamide film and the inorganic deposited layer after boiling treatment at 95° C. for 30 minutes as determined in the air is not less than 100 g/15 mm.

6. The film of claim 1, wherein an adhesion strength between the polyamide film and the inorganic deposited layer after boiling treatment at 95° C. for 30 minutes as determined in water is not less than 50 g/15 mm.

7. The film of claim 1, wherein the anchor coat layer has a compression modulus of not less than 3.0 kgf/mm$^2$ at 40° C.

8. The film of claim 1, wherein the anchor coat layer comprises a polyester resin or a graft copolymer of a polyester and an acrylic polymer.

9. The film of claim 1, further comprising a sealant layer laminated on the inorganic deposited layer.

10. The film of claim 9, wherein the sealant layer is a polyolefin resin film having a compression modulus of not less than 8 kgf/mm$^2$ at 95° C. and a Vicat softening point of not more than 145° C., and the maximum shrinkage percentage of the gas barrier resin film after boiling treatment at 95° C. for 30 minutes relative to the maximum shrinkage percentage of the polyamide film after boiling treatment at 95° C. for 30 minutes is less than 70%.

11. The film of claim 9, further comprising an adhesive layer between the inorganic deposited layer and the sealant layer.

12. The film of claim 11, wherein the adhesive layer has a compression modulus of not less than 8.8 kgf/mm$^2$ at 40° C.

13. The film of claim 1, having an oxygen permeability after boiling treatment at 95° C. for 30 minutes of not more than 15 cc/m$^2$·atm·day.

14. The film of claim 1, having a water vapor transmission after boiling treatment at 95° C. for 30 minutes of not more than 10 g/m$^2$·day.

15. The film of claim 1, having a peeling strength of not less than 500 g/15 mm as measured by a 90° peel test after heat sealing two sheets of said film at 2 kgf/cm$^2$ for one second at not more than 160° C.

16. The film of claim 1, having a blocking property as measured according to ASTM-D 1893-67 of not more than 10 g/20 mm.

* * * * *

UNITED STATES PATENT AND TRADEMARK OFFICE
CERTIFICATE OF CORRECTION

PATENT NO. : 5,939,205
DATED      : August 17, 1999
INVENTOR(S): Yokoyama, et. al.

It is certified that error appears in the above-identified patent and that said Letters Patent is hereby corrected as shown below:

Title page, under Foreign Patent Documents:

"48511    12/1976  Japan" should be deleted.

"101428   5/1987   Japan

"1267036  10/1989  Japan

"7276571  10/1995  Japan

Signed and Sealed this

Second Day of May, 2000

Attest:

Q. TODD DICKINSON

*Attesting Officer*                *Director of Patents and Trademarks*